United States Patent [19]

Cornet et al.

[11] Patent Number: 5,102,987
[45] Date of Patent: Apr. 7, 1992

[54] PREPARATION OF HYDROLYZED PROTEIN HAVING REDUCED α-CHLOROHYDRIN CONTENT

[75] Inventors: Paul E. Cornet, Greenwich; Rebecca S. So, New Milford; John S. Tandy, Litchfield, all of Conn.

[73] Assignee: Nestec S.A., Vevey, Switzerland

[21] Appl. No.: 258,191

[22] Filed: Oct. 14, 1988

[51] Int. Cl.$^5$ .......................... C07K 1/12; C07K 3/10
[52] U.S. Cl. .................................... 530/343; 530/350; 530/356; 530/357; 530/370; 530/372; 530/373; 530/374; 530/375; 530/376; 530/378; 530/377; 530/407; 530/412; 530/414; 530/427

[58] Field of Search ............... 530/407, 356, 357, 375, 530/377, 378, 379, 372, 343, 370, 350, 412, 414, 418, 419, 420, 427; 514/2, 12, 21

[56] References Cited

U.S. PATENT DOCUMENTS

| | | | |
|---|---|---|---|
| 1,035,591 | 8/1912 | Ikeda et al. | 530/407 |
| 2,538,898 | 1/1951 | Cleland et al. | 530/407 |
| 2,991,309 | 7/1961 | Hoglan et al. | 530/407 |
| 3,118,815 | 1/1964 | Li | 530/407 |
| 3,391,001 | 7/1968 | Sair | 530/407 |
| 3,493,385 | 2/1970 | Hack | 99/17 |
| 4,759,944 | 7/1988 | Fäsi et al. | 530/407 |

OTHER PUBLICATIONS

Smith, Food Service Science (Avi Publishing Co. Inc., Westport, Conn.), 294-295 (1974).
Velisek, et al., "Chlorohydrins in Protein Hydrolysates", Z. Lebensm Unters Forsch 167, pp. 241-244 (1978).

Primary Examiner—F. T. Moezie
Assistant Examiner—Andrew G. Rozycki
Attorney, Agent, or Firm—Vogt & O'Donnell

[57] ABSTRACT

The α-chlorohydrin content of liquid hydrolysed protein obtained by acid hydrolysis with hydrochloric acid is reduced by adjusting the pH of the liquid hydrolysed protein to a pH of from 8 to 14 and holding the liquid for a time sufficient for the α-chlorohydrin content of the liquid hydrolysed protein to be reduced.

19 Claims, No Drawings

PREPARATION OF HYDROLYZED PROTEIN HAVING REDUCED α-CHLOROHYDRIN CONTENT

The present invention relates to a process for the preparation of hydrolyzed protein having reduced α-chlorohydrin content.

BACKGROUND OF THE INVENTION

Hydrolysed proteins have been known in food systems for centuries in the Far East in the form of soy sauce which traditionally has been prepared by enzymatic hydrolysis which requires a long period of time, usually several months, for preparation.

About 100 years ago, a more rapid method of hydrolysing proteins for producing flavours was developed using hydrochloric acid in which the time required is only a few hours. In this acid hydrolysis process, vegetable plant or animal proteins derived from corn, soy, wheat, rice, yeast, peanut or casein are commonly used as starting protein sources and are usually obtained as a result of the separation of the protein fraction during milling of grains or following solvent extraction of oils. The protein contents of these raw materials may range from 40% to 90% with a general average of about 60%. Normally, the protein source is hydrolysed with hydrochloric acid having a concentration of about 20% by weight at a temperature from about 120°-135° C. over a period from about 5 to 8 hours and at elevated pressure up to 30 psig (2 bars). Following hydrolysis, the slurry is neutralised with a suitable alkaline material such as sodium hydroxide or sodium carbonate to a pH from 5.0 to 5.3 and the residual unhydrolysed material (lignin, humin) filtered out. The slurry may be decolourised prior to filtration or the filtrate following filtration may be decolourised by conventional means e.g., activated carbon, absorption resins. Following filtration of the unhydrolysed material, the dilute liquid can be concentrated to precipitate part of the salt formed and then refiltered. Afterwards, the liquid which contains about 42% solids may be further concentrated to pastes or dried by any conventional means such as spray drying or vacuum drum drying to powdered products. Thus, acid hydrolysed proteins can be in either liquid, paste or powder form and are composed mainly of amino acids and salt resulting from the acid catalysed breakdown of peptide bonds present in edible proteinaceous materials. The flavour of the product will, of course, vary depending upon the type of source of protein used as the raw material.

However, the use of hydrochloric acid in the hydrolysis of proteins leads to the formation in side reactions of certain undesirable chlorinated by-products such as α-chlorohydrins. There are various possible processes which may be considered for reducing the quantities of these compounds. For instance, it would be possible to use a starting material which does not contain any fats, since glycerol is one of the precursors which enables chlorohydrins to be formed with hydrochloric acid. However, on the one hand, starting materials such as these are more or less commercially unobtainable and, on the other hand, would significantly modify the organoleptic qualities of the flavour. In another possibility, hydrolysis could be carried out with a chlorine free mineral acid such as sulfuric acid or phosphoric acid. However, such a modification of the traditional process would also have adverse affects upon the organoleptic qualities of the flavour obtained.

SUMMARY OF THE INVENTION

We have developed a process for the production of hydrolysed proteins using hydrochloric acid in which the quantity of undesirable chlorinated compounds is substantially reduced without having a substantial adverse effect on the organoleptic characteristics of the hydrolysed protein product and wherein a flavour may be achieved which is substantially similar to that of a hydrolysed protein produced under normal conditions.

Accordingly, the present invention provides a process for the production of a hydrolysed protein which comprises hydrolysing a plant or animal protein with hydrochloric acid to give a slurry and then, before or after filtering off the residual unhydrolysed material, adjusting the pH of the liquid hydrolysed protein to a pH of from 8 to 14 and if the liquid obtained from the hydrolysis reaction has not been filtered before treatment, unhydrolysed protein is filtered from the treated liquid, and to a pH of from 4 to 7, holding the pH adjusted liquid for a time sufficient for reducing the amount of chlorohydrins in the liquid hydrolysed protein and then adjusting the pH of the pH adjusted liquid, the liquid hydrolysed protein filtrate may be concentrated to precipitate some of the salt formed and refiltered to give a liquid hydrolysed protein product.

DETAILED DESCRIPTION OF THE INVENTION

The plant or animal protein employed to provide the hydrolysed protein treated by the present invention may be derived from various origins such as corn, soy, wheat, rice, yeast, peanut or casein and is usually obtained by separation of the protein fraction during milling of grains or following solvent extraction of oils. For example, it is possible to use oil seed cakes, cereal gluten or defatted soya flour.

The hydrochloric acid used for the hydrolysis is preferably concentrated and may have a concentration from 15% to 5%, preferably from 16% to 22% and especially from 17% to 19% by weight. The amount of protein material may vary widely, for instance from 30 to 50% by weight, but more usually from 35 to 45% by weight and preferably from 38 to 42% by weight based on the total weight of hydrolysis mixture.

The temperature of the hydrolysis may be from 70° C. to 140° C., more usually from 100° C. to 130° C., preferably from 105° C. to 120° C. and especially from 110° C. to 115° C..

The duration of the hydrolysis may vary from 2 to 12 hours more usually from 2.5 to 8 hours, generally longer periods of time being required at lower temperatures. Advantageously, the duration of the hydrolysis is from 3 to 7 hours, especially from 3 to 5 hours.

We have found that by decreasing either the acid concentration from the normal 20% to about 18%, the temperature from the normal 120°-135° C. to 110°-115° C. or the duration from the normal 5-8 hours to 3-4 hours, or a combination of two or more of these processing parameters, the amount of the undesirable chlorinated compounds can be reduced significantly.

The hydrolysis may be carried out with stirring and, if desired, under elevated pressure for instance up to 100 psig and more usually from 10 to 50 psig.

After hydrolysis, before or after filtering off the residual unhydrolysed material, the hydrolysed protein is first treated with a food-acceptable strong alkali such as KOH or NH$_4$OH, but preferably NaOH and/or Na$_2$CO$_3$ to adjust the pH to from 8 to 14 and then held at a temperature and for a period of time to reduce the amount of undesirable chlorinated compounds. The pH is preferably adjusted to from 9 to 13 and especially from 10 to 12 by the alkaline treatment. Generally, alkaline treatments to higher pH values require shorter processing times than treatments to lower pH values because the higher the concentration ratio of (OH$^-$) to the α-chlorohydrin, the faster the reaction and the greater will be the reduction in quantity of the α-chlorohydrin. In addition, at any particular pH, the higher the temperature employed, the shorter the time necessary. For example, the temperature may range from ambient to 100° C.. The time period may range from a few seconds at high pH and temperatures above ambient, to 24 hours or even several weeks or more at ambient temperatures. The actual processing time and the temperature at any given pH is dictated by the residual quantity of undesired chlorinated product and the overall desired organoleptic acceptance of the hydrolysed protein.

The pH of the alkaline hydrolysed protein is then to a pH from 4 to 7 preferably from 5 to 5.5, with acid, usually hydrochloric acid at a temperature usually from 10° C. to 50° C. and preferably from 20° C. to 30° C. although higher or lower temperatures may be employed. The residual unhydrolysed material consisting mainly of lignin and humin is filtered off from the slurry before or after the pH adjustment. The slurry may be decolourised prior to filtration, or the liquid filtrate following filtration may be decolourised by conventional means, e.g., activated carbon, absorption resins. The liquid hydrolysed protein filtrate may then be concentrated, for instance, by evaporation, to precipitate some of the salt formed and then refiltered to remove this precipitated salt to give a liquid hydrolysed protein product which may contain from 20% to 50%, and preferably from 35% to 45% by weight of solids. The liquid hydrolysed protein product may then be evaporated further to give a paste of about 85% by weight of solids, and if desired, the paste may be dried and ground to give a powder usually containing about 96–98% by weight of solids.

EXAMPLES

The following Examples further illustrate the present invention.

EXAMPLE 1

100 kg of corn gluten containing about 60% protein is hydrolysed with 180 kg of 20% hydrochloric acid at 120° C. for 7 hours. The resultant slurry is filtered to remove unhydrolysed material such as lignin and humin, decolourised with active carbon, and the liquid filtrate is then treated with sodium hydroxide solution to a pH of 11.5 and held at the times and temperatures indicated in the following Table I which gives the α-chlorohydrin content as a percentage. The pH is then readjusted to 5.2 with hydrochloric acid at 25° C., and the liquid hydrolysed protein filtrate is then concentrated by evaporation to precipitate some of the salt formed and refiltered to give a liquid hydrolysed protein product having a solids content of 42% by weight. The product has a more rounded, less acidic character when compared with a product prepared by the normal process.

TABLE I

| Time (hrs) | 35° C. | 45° C. | 55° C. |
|---|---|---|---|
| 0.00 | 100.00 | 100.00 | 100.00 |
| 0.25 | 58.01 | 33.78 | 34.69 |
| 0.50 | 0.41 | ND | 0.04 |
| 0.75 | 0.30 | 0.10 | ND |
| 1.00 | 0.19 | 0.07 | ND |
| 2.00 | 0.04 | 0.07 | ND |
| 3.00 | 0.03 | ND | ND |
| 4.00 | 0.02 | ND | ND |

(ND = not detected)

It can be seen that increased holding temperatures and times lead to a greater reduction in the quantity of α-chlorohydrin, and that at higher temperatures, shorter times may be used to obtain a specific reduction in the quantity of α-chlorohydrin.

EXAMPLE 2

The procedure in Example 1 was repeated except that the liquid filtrate treated with sodium hydroxide was held at 24° C. for 14 hours at the pH values indicated in Table II which indicates the percentage α-chlorohydrin content compared with a control at a pH of 5.47.

TABLE II

| pH | α-chlorohydrin % |
|---|---|
| 5.47 | 100.00 |
| 8.24 | 88.76 |
| 9.01 | 78.77 |
| 9.23 | 68.25 |
| 9.47 | 50.22 |
| 9.96 | 13.05 |
| 10.25 | 4.79 |
| 10.43 | ND |
| 10.95 | ND |

EXAMPLE 3

The procedure in Example 1 was repeated except that the hydrolysis was carried out with 18% hydrochloric acid at 110° C. for 3.5 hours and the liquid filtrate treated with sodium hydroxide solution to a pH of 11.5 was held at 35° C. for 15 minutes. The flavour of the product was found to be very similar to normally prepared hydrolysed plant proteins. The α-chlorohydrin content was so low as to be undetectable.

We claim:

1. A process for reducing α-chlorohydrin content of a product obtained from protein hydrolysed with hydrochloric acid comprising adjust the pH of liquid containing hydrolysed protein obtained by hydrolysis of protein with hydrochloric acid to a pH consisting of from 8 to 14 and holding the pH-adjusted liquid for a time at a temperature sufficient to reduce α-chlorohydrin content of the liquid hydrolysed protein.

2. A process according to claim 1 wherein the pH is adjusted to from 10 to 12.

3. A process according to claim 1 wherein the pH-adjusted liquid is held at a temperature of from ambient temperature to a temperature of 100° C.

4. A process according to claim 1 wherein the pH of the liquid is adjusted with a food acceptable alkali.

5. A process according to claim 1 wherein the pH of the liquid is adjusted with an alkali selected from NaOH and Na$_2$CO$_3$ or combinations thereof.

6. A process for preparing hydrolysed protein comprising hydrolysing protein with hydrochloric acid and obtaining a liquid containing hydrolysed protein, adjusting the pH of the liquid to a pH consisting of from 8 to 14 and holding the pH-adjusted liquid for a time at a temperature sufficient to reduce α-chlorohydrin content of the liquid hydrolysed protein and then adjusting the pH-adjusted liquid to a final pH of from 4 to 7.

7. A process according to claim 6 wherein the pH of the liquid containing hydrolyzed protein is adjusted to a pH of from 10 to 12.

8. A process according to claim 6 wherein the pH-adjusted liquid is held at a temperature of from ambient temperature to a temperature of 100° C.

9. A process according to claim 6 wherein the pH-adjusted liquid is adjusted to a final pH of from 5 to 5.5.

10. A process according to claim 6 wherein the pH-adjusted liquid is adjusted to a final pH at a temperature to a final pH at a temperature of from 10° C. to 50° C.

11. A process according to claim 6 wherein the pH of the liquid containing the hydrolyzed protein is adjusted with a food acceptable alkali.

12. A process according to claim 6 wherein the pH of the liquid is adjusted with an alkali selected from of NaOH and $Na_2CO_3$ or combinations thereof.

13. A process according to claim 6 wherein the protein is hydrolyzed with hydrochloric acid having a concentration of from 17% to 19% by weight based upon the weight of the protein and hydrochloric acid.

14. A process according to claim 6 wherein the protein is hydrolysed at a temperature of from 100° C. to 115° C.

15. A process according to claim 6 wherein the protein is hydrolysed with the hydrochloric acid for from 3 hours to 5 hours.

16. A process according to claim 6 wherein the protein is hydrolysed with hydrochloric acid having a concentration of from 17% to 19% by weight based upon the weight of the protein and hydrochloric acid for from 3 hours to 5 hours at a temperature of from 110° C. to 115° C.

17. A process according to claim 6 wherein the protein is hydrolysed with the hydrochloric acid at a pressure up to 100 psig.

18. A process according to claim 6 wherein the liquid is a filtrate obtained from filtering unhydrolysed protein from hydrolysed protein.

19. A process according to claim 8 wherein the liquid contains unhydrolysed protein and further comprising filtering the liquid adjusted to a pH of from 4 to 7 to obtain a liquid hydrolysed protein filtrate.

* * * * *

UNITED STATES PATENT AND TRADEMARK OFFICE
CERTIFICATE OF CORRECTION

PATENT NO. : 5,102,987

DATED : April 7, 1992

INVENTOR(S) : Paul E. CORNET, et al.

It is certified that error appears in the above-identified patent and that said Letters Patent is hereby corrected as shown below:

Column 2, lines 19-25 delete:

"if the liquid obtained from the hydrolysis reaction has not been filtered before treatment, unhydrolysed protein is filtered from the treated liquid, and to a pH of from 4 to 7, holding the pH adjusted liquid for a time sufficient for reducing the amount of chlorohydrins in the liquid hydrolysed protein and then adjusting the pH of the pH adjusted liquid,"

and insert therefor:

--holding the pH adjusted liquid for a time sufficient for reducing the amount of chlorohydrins in the liquid hydrolysed protein and then adjusting the pH of the pH adjusted liquid to a pH of from 4 to 7. If the liquid obtained from the hydrolysis reaction has not been filtered before treatment, unhydrolysed protein is filtered from the treated liquid, and--.

Column 4, line 50 (line 3 of claim 1), "adjust" should be --adjusting--.

Column 5, line 12 (line 1 of claim 9), after "wherein" insert --the pH of--.

UNITED STATES PATENT AND TRADEMARK OFFICE
CERTIFICATE OF CORRECTION

PATENT NO. : 5,102,987

DATED : April 7, 1992

INVENTOR(S) : Paul E. CORNET, et al.

It is certified that error appears in the above-identified patent and that said Letters Patent is hereby corrected as shown below:

Column 5, line 16 (line 3 of claim 10), delete "to a final pH at a temperature".

Column 5, line 21 (line 2 of claim 12), delete "of".

Column 6, line 4 (line 2 of claim 14), "100°C" should be --110°C--.

Signed and Sealed this

Twenty-ninth Day of June, 1993

*Attest:*

MICHAEL K. KIRK

*Attesting Officer*　　　*Acting Commissioner of Patents and Trademarks*